Dec. 28, 1937. J. J. CARNER 2,103,710
COMBINED PLANT SETTING AND FERTILIZING IMPLEMENT
Filed Aug. 18, 1936 2 Sheets-Sheet 1
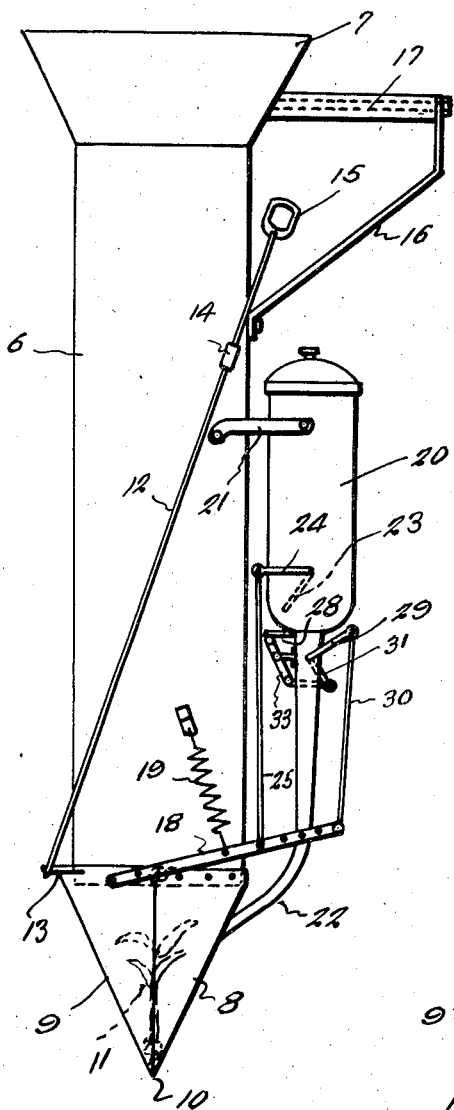
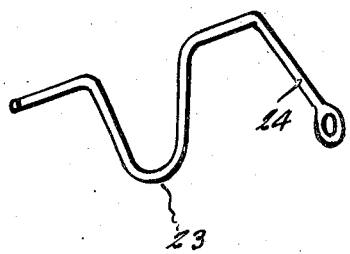
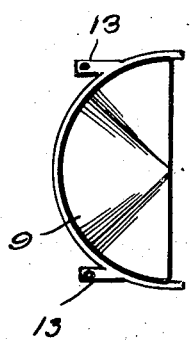
Inventor
John J. Carner
By *Clarence A. O'Brien*
*Hyman Berman*
Attorneys

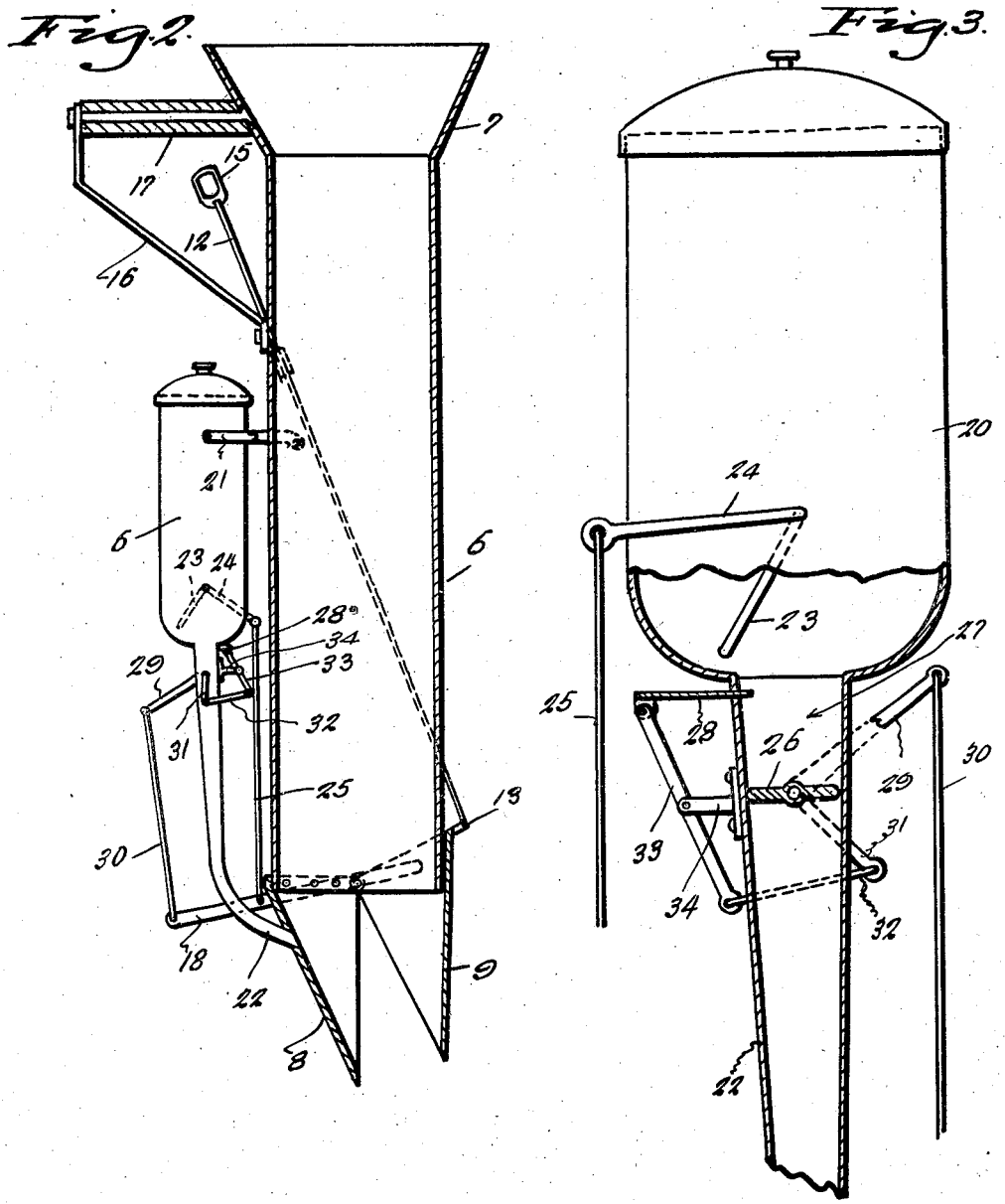

Patented Dec. 28, 1937

2,103,710

UNITED STATES PATENT OFFICE 2,103,710

COMBINED PLANT SETTING AND FERTILIZ-
ING IMPLEMENT

John J. Carner, Cloudcroft, N. Mex.

Application August 18, 1936, Serial No. 96,672

4 Claims. (Cl. 111—4)

The present invention relates to agricultural implements and devices, and has reference in particular to a unitary combination structure expressly designed for penetrating the earth and simultaneously setting in the hole a plant and a predetermined supply of fertilizing compound or material.

It is a matter of common knowledge that soil in arid areas lacks the requisite properties of nutrition to properly aid the growth of plants such as cabbage, peas, beans, and the like. Under the circumstances it is the present policy to fertilize each and every plant in order to compensate for the deficiency in the natural soil. Manure and barn-yard fertilizer is not always readily available to the small farmer. Not only this, when such fertilizers are used, under the present practice an undue quantity must be spread over the surface. It follows, therefore, that in view of these difficulties, I have perfected a portable device to aid in setting plants and to at the same time supply each plant with a predetermined amount of proper fertilizing compound.

In reducing the principles of the inventive conceptions to practice, I have adopted special features and an equally special coordination thereof whereby it is possible to accomplish the desired result in an efficient manner and to at the same time accomplish desired results with an expenditure of little time and labor.

Briefly, the preferred embodiment of the invention comprises a cylinder which is in effect a delivery chute for the plant, this being provided at its lower end with ground penetrating means, and being provided on one side with the fertilizer container, means being also associated with these parts to properly control the planting and delivery of the fertilizer in predetermined charges.

Other features and advantages will become more readily apparent from the following description and drawings.

In the accompanying drawings, wherein like numerals are employed to designate like parts throughout the views:

Figure 1 is an elevational view of a plant placement and fertilizing device or implement constructed in accordance with the present invention showing the plant ready to be placed in the ground.

Figure 2 is a sectional view, partly in elevation, based on Figure 1, and showing the movable spade or jaw swung to open position to release the plant, and also showing the position of the operating mechanism for controlling the release of the fertilizer.

Figure 3 is an enlarged view, partly in section and partly in elevation, detailing the valve mechanism constituting the feature of importance characterizing the fertilizer container and delivery means.

Figure 4 is a perspective view of the oscillatory agitator used in the fertilizer container.

Figure 5 is a detail view of the semi-conical movable jaw or ground penetrating member.

Referring now to the drawings by detail reference characters, it will be observed that the open ended tubular cylinder is denoted by the numeral 6. This is provided at its upper end with a suitable hopper 7 to facilitate dropping the plant into the cylinder so that it will descend into the sectional receiver at the bottom of the cylinder. This receiver functions not only as a trap for holding the plant and collecting the fertilizer, but constitutes a ground penetrating structure to permit the desired successive results to be progressively and expeditiously accomplished. It will be noted that said receiver comprises companion semi-conical sections, one section 8 of which is rigid or fixed, and the other section pivotally mounted and swingable in relation thereto. The two sections come together in providing a penetrating point 10 to enter the ground and bore the hole for reception of the plant 11. The movable pivoted section 9 is provided with outstanding ears or lugs and operating rods 12 are connected thereto as indicated at 13. The rods are of duplicate construction and located on diametrically opposite sides of the cylinder on the outside thereof and operate through suitable guides 14, the upper ends of the rods terminating in hand-grips 15 located within the frame 16 carrying the main handle or hand-grip 17, used for carrying as well as ground penetrating and thrust purposes.

Attention is now called to an operating lever or arm 18 rigidly connected at one end to the pivoted or swingable jaw 9. Adjacent to this is a suitable properly anchored return spring 19. The purpose of this lever is to operate the mechanism which controls the discharge of the fertilizer. The fertilizer is contained in a tank or receptacle 20 attached by a bracket 21 to one side of the cylinder. The tank is provided with a delivery spout or pipe 22 which leads into the fixed jaw 8 as shown better in Figure 2. Mounted for oscillation in the bottom of the tank is a suitable wire agitator 23 which is actuated by a rocker arm 24 having operating connection by way of a link or wire 25 to the aforementioned lever 18. Hence, as the jaw 9 is swung open and closed the agitator is moved to stir and loosen the fertilizer in the tank 23.

It is desirable to deliver a predetermined quantity of charge of the fertilizing compound down through the pipe or spout 22 each time a plant is placed or set in the ground. Two valves are employed in accomplishing this result. The main valve may be described as a butterfly valve and this is denoted by the numeral 26 in Figure 3. It is a pivoted plate and serves to define above itself the charge containing and measuring pocket 27. The complemental valve, which is alternately operable, is a slide plate valve 28 and operates through a slot in the upper portion of the pocket 27. This is a cut-off valve and prevents the discharge of material from the hopper or tank 20 into said pocket 27 when the valve 26 is open. The valves operate in unison, but alternately or successively to accomplish the desired result as is evident. For example, the butterfly valve 26 is operated by a crank arm 29 which is in turn operatively connected with the aforesaid lever 18 by way of a link 30. Then there is a diverging crank arm at 31 which connects with a link 32 which serves to actuate the valve operating arm 33. This is mounted on a suitable bracket 34 and has pivoted operating connection with the slide plate valve 28.

In operation and practice it is understood that, as a general rule, two attendants will be required to satisfactorily perform the planting work. One attendant will carry and operate the ground penetrating setting and fertilizing device. The other attendant will handle the plant. When it is desired to set a cabbage plant or the like in the ground, it is evident that one of the said attendants drops the plant into the hopper 7 so that it gravitates through the chute-like cylinder 6 and lodges itself in the conical receiver composed of the jaw sections 8 and 9. The attendant operating the machine or device uses the handle 17 as a means of forcing the point 10 of the jaws into the ground, thus boring a hole for reception of the plant. As the device is lifted up, said attendant catches hold of the handle 15 to simultaneously actuate the rod 12. In so doing the jaw 9 is swung open to allow the plant 11 to drop out into the hole. At the same time, the opening of the jaw 9 serves to operate the lever 18 which in turn actuates the link 30 and crank arm 29 to open the valve 26 to allow the charge of fertilizer to gravitate into the hole and around the plant. At this same time the mechanism comprising the features 31, 32, and 33 closes the plate valve 28 and cuts off a further supply of fertilizer. Consequently, each charge of fertilizer is successively dropped from the pocket 27 into the hole. It follows, also, that when the rods 12 are released, the jaw 9 closes under the action of the springs 19 and this re-sets the valve, whereby the valve 26 swings to the closed position shown in Figure 3 and the valve 28 to the open position to trap the next charge for subsequent delivery. While all of this is going on, it is evident that the agitator 23 is intermittently operated to loosen the fertilizer and to prevent clogging.

It is though that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. In a structure of the class described, a cylinder, a conical plant receiving and ground penetrating device at the lower end of said cylinder, and provided at its ground penetrating end with a movable closure member, means for moving the closure member to open position for releasing the plant, a fertilizer container attached to said cylinder, a gravity discharge delivery pipe having its inlet connected with said container and its outlet connected with the conical ground penetrating device, a pivoted butterfly valve in the upper portion of said pipe adjacent the container, a slide plate valve above said first-named valve cooperating therewith in defining a measuring pocket and valve operating means connecting one of said valves with the means for moving the closure member whereby said valves are operated simultaneously with the movement of the closure member to open position.

2. In a structure of the class described, a cylinder adapted to receive the plant, a conical ground penetrating device at the lower end of said cylinder embodying a relatively fixed semiconical section and a relatively movable semiconical companion section, a rod slidably mounted on said cylinder and connected with said movable section, a lever also connected with said movable section, a fertilizer tank supported on said cylinder, a delivery conduit leading down from said tank and connected with the fixed section of said conical device, a valve in said conduit and an operating connection between said valve and lever.

3. In a structure of the class described, a cylinder adapted to receive the plant, a conical ground penetrating device at the lower end of said cylinder embodying a relatively fixed semiconical section and a relatively movable semiconical section, a rod slidably mounted on said cylinder and connected with said movable section, a lever also connected with said movable section, a fertilizer tank supported on said cylinder, a delivery conduit leading down from said tank and connected with the fixed section of said conical device, a valve in said conduit, an operating connection between said valve and lever, a second valve in said conduit above said first-named valve and alternately operable in relation thereto, and an operating connection between said valves whereby they are simultaneously operated.

4. As a component part of an assemblage of the class described, a receptacle constituting a container for fertilizer, means for mounting said receptacle on a plant setting implement, a gravity discharge fertilizer delivery conduit connected to the bottom of said receptacle, a pivoted butterfly valve in the upper portion of said conduit, a slide plate valve in said conduit above said first-named valve and defining therebetween a measuring pocket for the fertilizer, a crank arm cooperating with the butterfly valve, an operating arm for said slide valve, an operating connection between said crank arm and slide valve operating arm for causing said valves, when operated, to move in unison but to function oppositely for delivering a metered charge of fertilizer, and means for operating said butterfly valve.

JOHN J. CARNER.